(12) United States Patent
Chueh

(10) Patent No.: US 9,722,364 B1
(45) Date of Patent: Aug. 1, 2017

(54) OUTDOOR EXTERNAL LIGHTNING ARRESTOR

(71) Applicant: GRAND-TEK TECHNOLOGY CO., LTD., New Taipei (TW)

(72) Inventor: Chun-Chien Chueh, New Taipei (TW)

(73) Assignee: GRAND-TEK TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/390,464

(22) Filed: Dec. 24, 2016

(51) Int. Cl.
*H01R 4/66* (2006.01)
*H01R 13/6581* (2011.01)
*H02H 9/06* (2006.01)
*H02H 1/04* (2006.01)
*H01R 24/64* (2011.01)

(52) U.S. Cl.
CPC ......... *H01R 13/6581* (2013.01); *H01R 24/64* (2013.01); *H02H 1/04* (2013.01); *H02H 9/06* (2013.01)

(58) Field of Classification Search
CPC ............. H01R 13/6581; H01R 13/652; H01R 13/6583; H01R 13/6596; H01R 24/64; H01R 9/0518; H01R 4/48; H02H 1/04; H02H 9/06
USPC .......................................................... 439/96
See application file for complete search history.

(56) References Cited

U.S. PATENT DOCUMENTS

| | | | | |
|---|---|---|---|---|
| 7,210,947 | B1 * | 5/2007 | Fodero | H01R 13/6596 439/607.41 |
| 8,696,371 | B2 * | 4/2014 | Byrne | H01R 4/48 439/207 |
| 8,858,261 | B2 * | 10/2014 | Bauerle | H01R 9/0518 439/607.41 |
| 9,559,469 | B2 * | 1/2017 | Nishimori | H01R 13/6583 |
| 2014/0087573 | A1 * | 3/2014 | Kroeckel | H01R 13/652 439/96 |

\* cited by examiner

*Primary Examiner* — Jean F Duverne
(74) *Attorney, Agent, or Firm* — Chun-Ming Shih; HDLS IPR Services

(57) ABSTRACT

An outdoor external lightning arrestor includes a transmission line, a signal suppression circuit, insulation housing, a ground member, and a metal housing. The signal suppression circuit includes a circuit board thereon. A first connector, a second connector, and at least one protector are electrically connected to the circuit board. The first connector is electrically connected to the transmission line. The insulation housing is assembled to the circuit board and ground member, and the first resilient plate at one side of the ground member is in electrical contact with the second connector. The insulation housing is installed inside the metal housing, so that the second resilient plate at the other side of the ground member is in electrical contact with the metal housing.

10 Claims, 5 Drawing Sheets

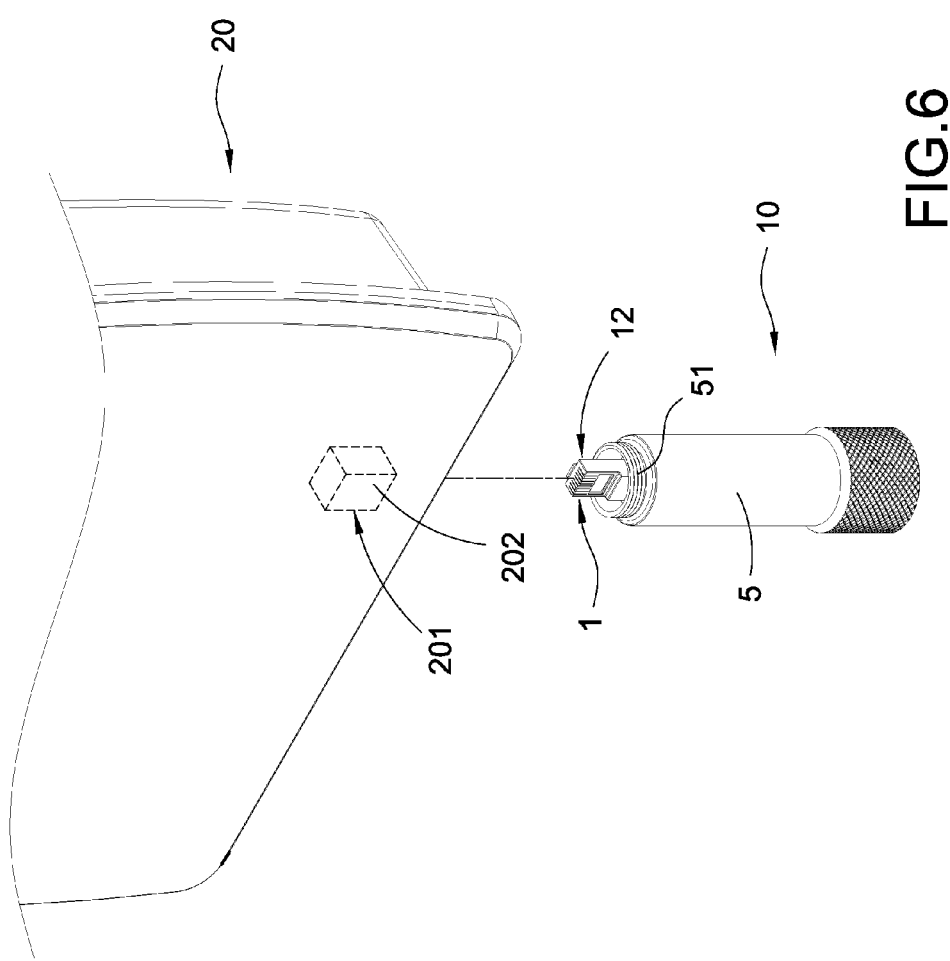

OUTDOOR EXTERNAL LIGHTNING ARRESTOR

TECHNICAL FIELD

The present invention relates to a lightning arrestor and, in particular, to an outdoor external lightning arrestor for preventing outside energy/power surges.

BACKGROUND

With development of technology, portable electronic communication devices have enhanced functions. The portable electronic communication devices have independent mobile operating system, so that application software and games can be installed for a variety of functions, and consequently, the portable electronic communication devices have been widely used in communication, business and entertainment.

In order to ensure smooth communication of the portable electronic communication device, numerous antennas are installed indoors or outdoors for providing an obstruction-free wireless transmission system to the portable electronic communication device. In an outdoor antenna, an antenna member is enclosed in a box, and then a cable gland is fastened to the box, so that a cable connected to the cable gland is electrically connected to the antenna member. When a user is using an electronic communication device outdoors, the outdoor antenna can receive and transmit signals of the electronic communication device, the signals are transmitted via the cable to the wireless transmission system for remote or nearby wireless communication.

Since most outdoor antennas have no lightning arrestors, when the antennas are affected by lightning or electrostatic events, surge signals will be transmitted along the cable to the wireless transmission system. Therefore, if the wireless transmission system has lightning arrestors or surge protectors, the wireless transmission system will not be damaged. However, if the wireless transmission system has no lightning arrestors or surge protectors, the wireless transmission system will be damaged.

SUMMARY

It is an object of the present invention to provide an outdoor external lightning arrestor for solving defects of conventional techniques. The outdoor external lightning arrestor is directly assembled between a receiver and a wireless transmitting system, so as to protect surge signals caused by lightning or electrostatic events from entering and damaging a wireless transmitting system via a cable.

Accordingly, the present invention provides an outdoor external lightning arrestor, comprising: a transmission line, a signal suppression circuit, insulation housing, a ground member, and a metal housing. The transmission line includes a cable, the cable at least includes a ground layer, one end of the cable is electrically connected to a male connector, a metal casing wraps outside the male connector, and the metal casing is electrically connected to the ground layer. The signal suppression circuit includes a circuit board thereon. A first connector, a second connector, and at least one protector are electrically connected to the circuit board. The first connector is electrically connected to the cable and the ground layer, and a metal casing wraps outside the second connector. The insulation housing is assembled to the circuit board, the second connector is exposed outside the insulation housing, and the transmission line extends outsides two housing members. The ground member is assembled inside the insulation housing, one side of the ground member includes a first resilient plate, the first resilient plate is in electrical contact with the metal casing of the second connector, the other side of the ground member includes a second resilient plate, and the second resilient plate is exposed outside the insulation housing. When an abnormal signal is input, a discharge path is selected according to configuration of the male connector, the signal suppression circuit and the ground member.

According to one embodiment of the present invention, the outdoor external lightning arrestor further includes a receiver, the receiver includes a female connector, and a metal casing wraps the female connector.

According to one embodiment of the present invention, the outdoor external lightning arrestor includes a metal housing, the metal housing is a hollow column, one end of the metal housing includes an external threaded portion, the other end of the metal housing includes an internal threaded portion, and the metal housing is assembled to the insulation housing, so that the second resilient plate is in electrical contact with the metal housing.

According to one embodiment of the present invention, the insulation housing consists of two housing members, a front end of each of the two housing members includes an assembling portion assembled on a buffer ring, a distal end of the two housing members includes an opening, the second connector is exposed from the opening, a through hole is disposed on an upper portion of the two housing members, and the second resilient plate is exposed from the through hole.

According to one embodiment of the present invention, the ground member includes a connection pillar, the first resilient plate of curved shape is connected at one side of the connection pillar, a connection plate extends from one side of the first resilient plate, the connection plate includes two connection holes, and the other side of the connection pillar is connected to the second resilient plate of curved shape.

According to one embodiment of the present invention, one of the two housing members includes a plurality of rib plates in longitudinal and transverse directions and also includes two protruding pillars disposed at one side of the rib plates and inserted through the two connection holes, the circuit board is fixed by the rib plates, the ground member is fixed by the two protruding pillars, a plurality of lock pillars are disposed among the rib plates, the lock pillars are disposed corresponding to a plurality of assembling holes of the other housing member, and a plurality of fastening elements are inserted through the assembling holes to fasten the lock pillars.

According to one embodiment of the present invention, a plurality of signal lines electrically connected to the male connector are disposed inside the cable, a separation layer wraps outside the signal lines, and the ground layer wraps outside the separation layer, and an insulation layer wraps outside the ground layer.

According to one embodiment of present invention, the male connector is an Internet connector plug.

According to one embodiment of the present invention, the second connector is an Internet female connector.

According to one embodiment of the present invention, the protectors are transient-voltage suppressors.

BRIEF DESCRIPTION OF THE DRAWINGS

The disclosure will become more fully understood from the detailed description, and the drawings given herein below is for illustration only, and thus does not limit the disclosure, wherein:

FIG. 6 is a schematic view illustrating the outdoor external lightning arrestor in use.

DETAILED DESCRIPTION

Detailed descriptions and technical contents of the present invention are illustrated below in conjunction with the accompany drawings.

Figure 1:
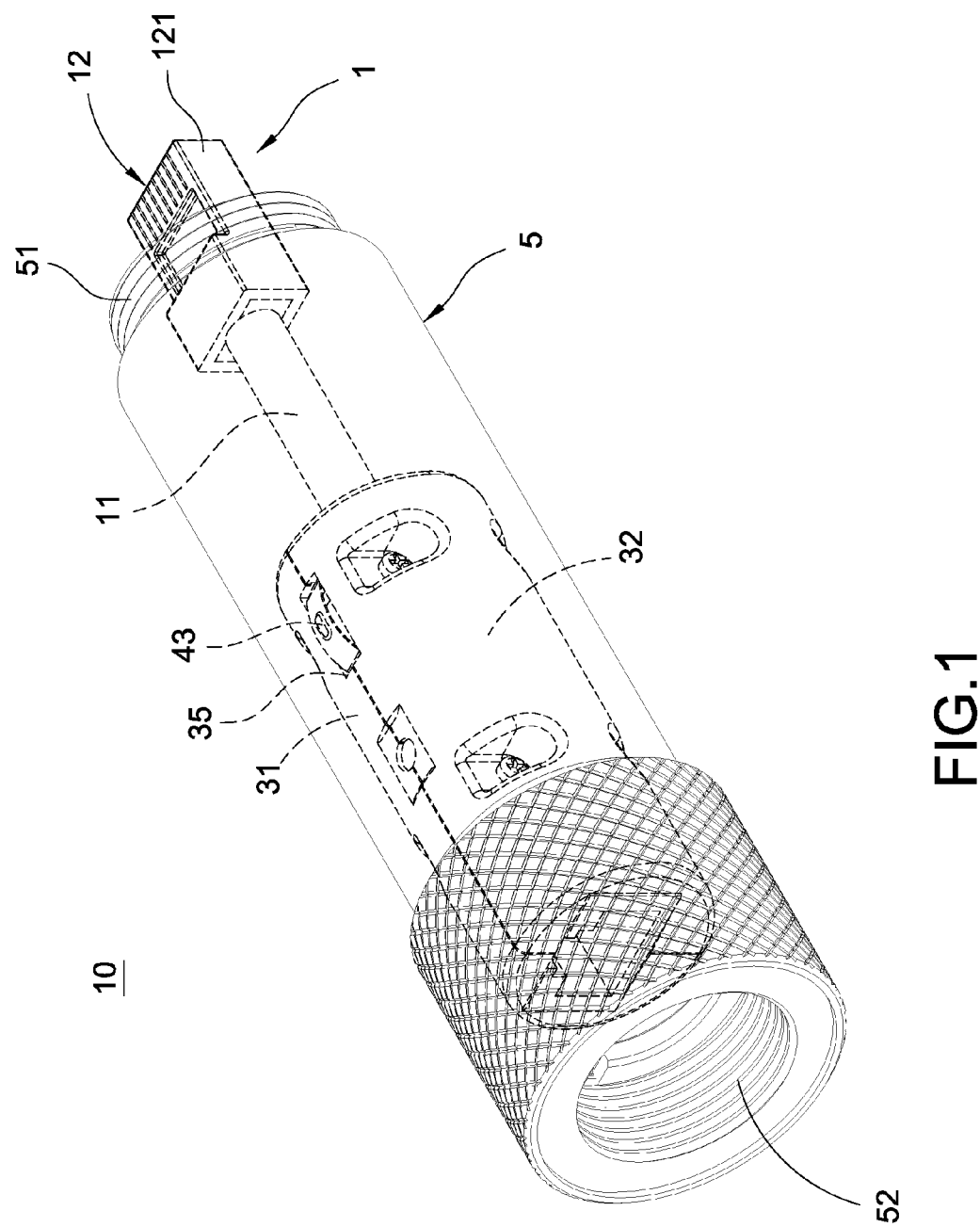
FIG. 1 is a perspective view of an outdoor external lightning arrestor according to the present invention.
Figure 2:
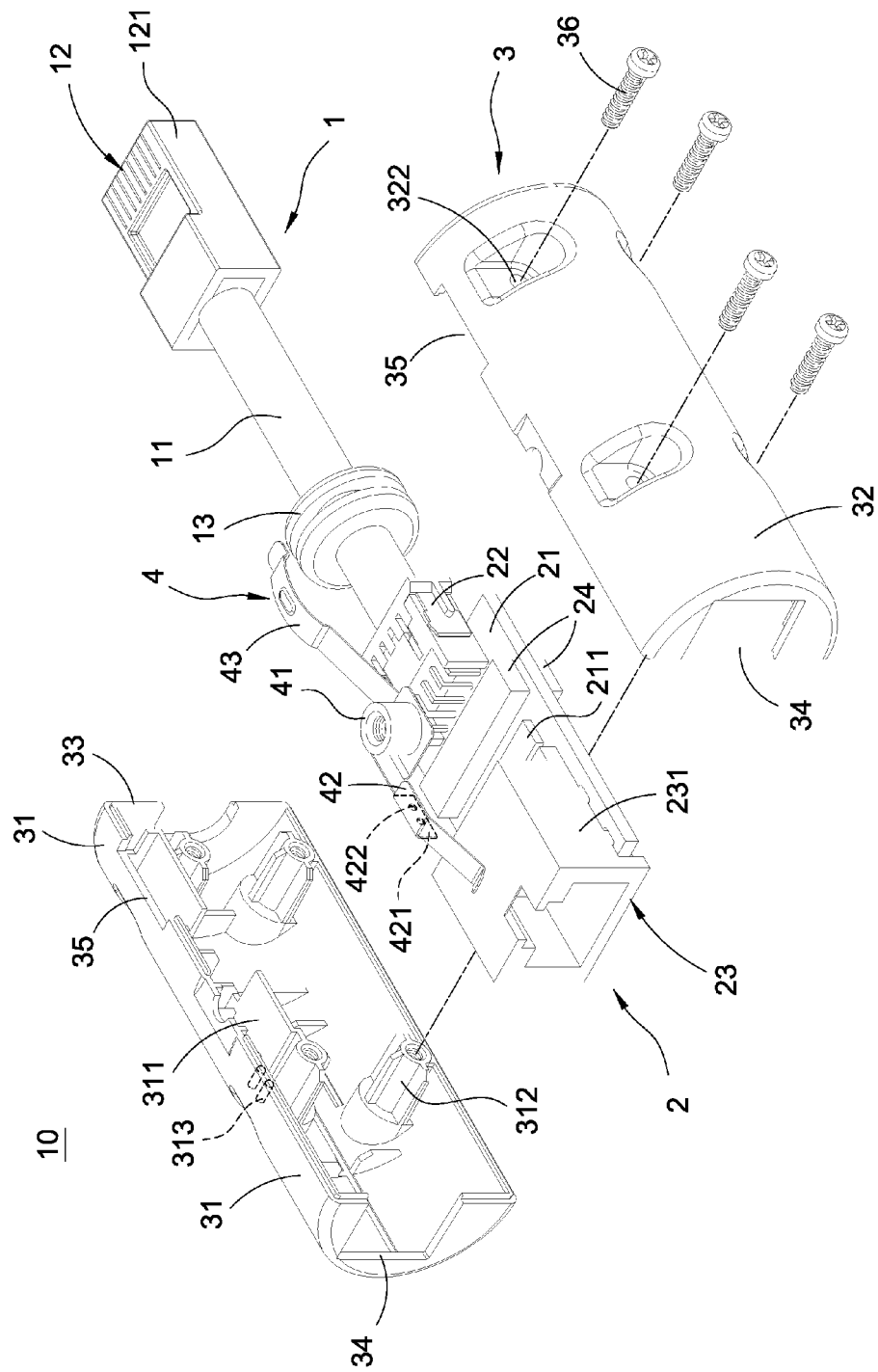
FIG. 2 is an exploded view of the outdoor external lightning arrestor of FIG. 1.

Please refer to FIGS. 1 and 2 which are a perspective view and an exploded view of an outdoor external lightning arrestor 10 according to the present invention. As shown in the drawings, the outdoor external lightning arrestor 10 includes a transmission line 1, a signal suppression circuit 2, an insulation housing 3, a ground member 4, and a metal housing 5. By means of the transmission line 1 and the signal suppression circuit 2, the outdoor external lightning arrestor 10 is electrically connected between electronic transmitting and receiving devices (not illustrated) to prevent entry of electrical surges or high voltage surges, thereby preventing electrical surges and lightning surges, thus ensuring safety in using the electronic devices.

Figure 4:
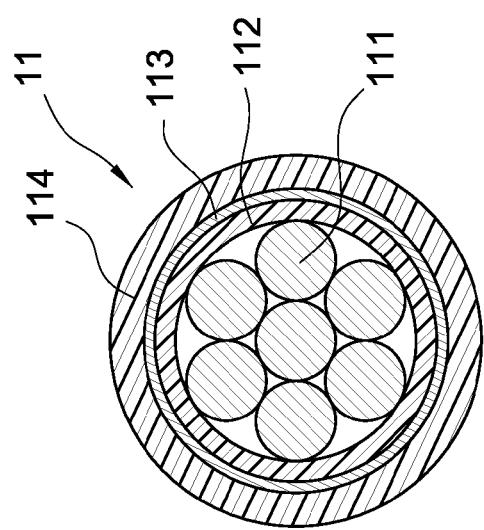
FIG. 4 is a cross-sectional view of a transmission line.

The transmission line 1 includes a cable 11, a male connector 12 electrically connected to the cable 11, a buffer ring 13 assembled onto the transmission line 1. A plurality of signal lines 111 (see FIG. 4) electrically connected to the male connector 12 are disposed inside the cable 11, a separation layer 112 wraps outside the signal lines 111, a web-like ground layer 113 wraps outside the separation layer 112, and an insulation layer 114 wraps outside the ground layer 113. In the drawing, the male connector 12 is an Internet connector plug (RJ-45) enclosed in a metal casing 121.

The signal suppression circuit 2 includes a circuit board 21. A first connector 22, a second connector 23, and a plurality of protectors 24 are electrically connected to the circuit board 21, the first connector 22 is electrically connected to the signal lines 111 and the ground layer 113 inside the cable 11, so that the ground layer 113 is electrically connected to a ground wire (not illustrated) on the circuit board 21. The second connector 23 is an Internet female connector (RJ-45) enclosed in a metal casing 231. The protectors 24 are transient-voltage suppressors (TVS) which collaborate with other electronic component 211 on the circuit board 21 to protect the electronic devices from being damaged or affected by electrostatic discharge (ESD), electrical fast transients (EFT), lightning, or cable discharge events (CDE).

The insulation housing 3 consists of two housing members 31, 32, and a front end of each of the two housing members 31, 32 includes an assembling portion 33 assembled on a buffer ring 13, thereby when the cable 11 of the transmission line 1 is pulled, the strain is alleviated, so breaking of the signal lines 111 is prevented. A distal end of the two housing members 31, 32 includes an opening 34, the second connector 23 is exposed from the opening 34, a through hole 35 is disposed on an upper portion of the two housing members 31, 32, and the ground member 4 is exposed from the through hole 35. One housing member 31 includes a plurality of rib plates 311 in longitudinal and transverse directions and also includes two protruding pillars 313 disposed at one side of the rib plates 311, the rib plates 311 are configured to support and fix the circuit board 21, and the two protruding pillars 313 are configured to fix the ground member 4. A plurality of lock pillars 312 are disposed among the rib plates 311, the lock pillars 312 are disposed corresponding to a plurality of assembling holes 322 of the other housing member 32, and a plurality of fastening elements 36 are inserted through the assembling holes 322 to fasten the lock pillars 312. Therefore, the circuit board 21 and the ground member 4 are fixed between the two housing members 31, 32.

The ground member 4 is assembled inside the insulation housing 3. The ground member 4 includes a connection pillar 41, the first resilient plate 42 of curved shape extends at one side of the connection pillar 41, the first resilient plate 42 is in electrical contact with the metal casing 231 of the second connector 23, a connection plate 421 extends from one side of the first resilient plate 42, the connection plate 421 includes two connection holes 422, the two connection holes 422 are engaged with the two protruding pillars 313, and the ground member 4 is fixed by heat-melting the protruding pillar 313 with heat-melting techniques. In addition, the second resilient plate 43 of curved shape extends from the other side of the connection pillar 41, and the second resilient plate 43 is exposed from the through hole 35 of the insulation housing 3, so that the second resilient plate 43 is in electrical contact with the metal housing 5.

The metal housing 5 is a hollow column, one end of the metal housing 5 includes an external threaded portion 51, and the other end of the metal housing 5 includes an internal threaded portion 52. After the insulation housing 3 is assembled with the circuit board 21 of the signal suppression circuit 2, the ground member 4 and the electrically-connected transmission line 1, the insulation housing 3 is assembled inside the metal housing 5 to form the outdoor external lightning arrestor 10.

Figure 3:
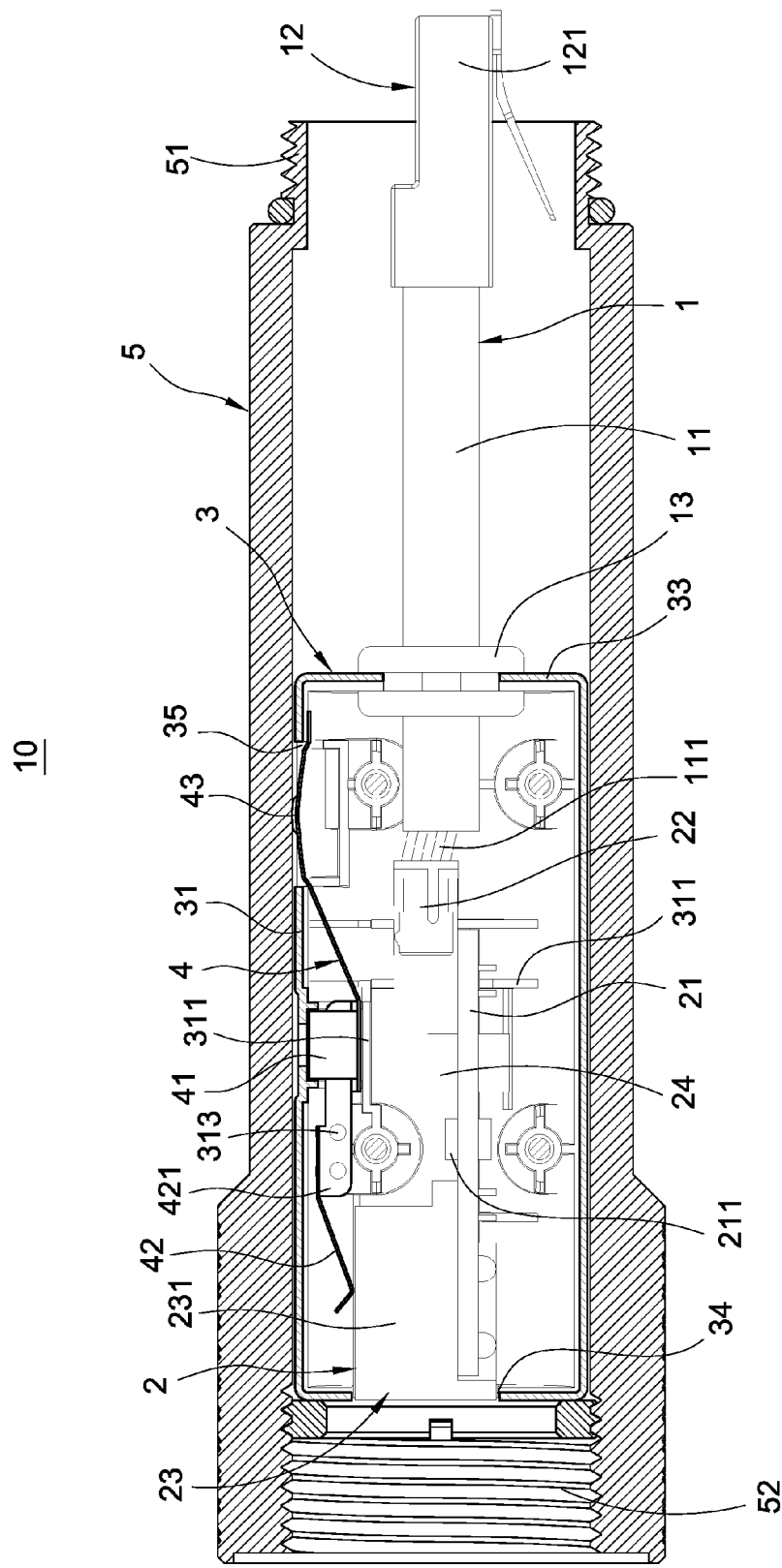
FIG. 3 is a lateral cross-sectional view of FIG. 1.

Please refer to FIG. 3 which is a lateral cross-sectional view of FIG. 1. As shown in the drawing, after the signal lines 111 inside the transmission line 1 are electrically connected to the first connector 22 on the circuit board 21, the two connection holes 422 of the ground member 4 are engaged with the two protruding pillars 313, and the ground member 4 is fixed by heat-melting the protruding pillar 313 with heat-melting techniques, so that the ground member 4 is fixed to the housing member 31. Then the circuit board 21 is assembled on the rib plates 311 of the insulation housing 3, a plurality of fastening elements 36 are inserted through the assembling holes 322 to fasten the lock pillars 312, an assembling portion 33 at a front end of the insulation housing 3 is assembled on the buffer ring 13 of the transmission line 1, and the second connector 23 is exposed from the opening 34 at a distal end of the insulation housing 3. Meanwhile, the first resilient plate 42 of the ground member 4 is in electrical contact with the metal casing 231 of the second connector 23 on the circuit board 21, and the second resilient plate 43 of the ground member 4 is exposed from the through hole 35 of the insulation housing 3.

After the insulation housing 3 is assembled with the circuit board 21 of the signal suppression circuit 2, the ground member 4, and the transmission line 1, the insulation housing 3 is assembled inside the metal housing 5, so that the second resilient plate 43 of the ground member 4 is in contact with the metal housing 5 to form one discharge path.

Figure 5:
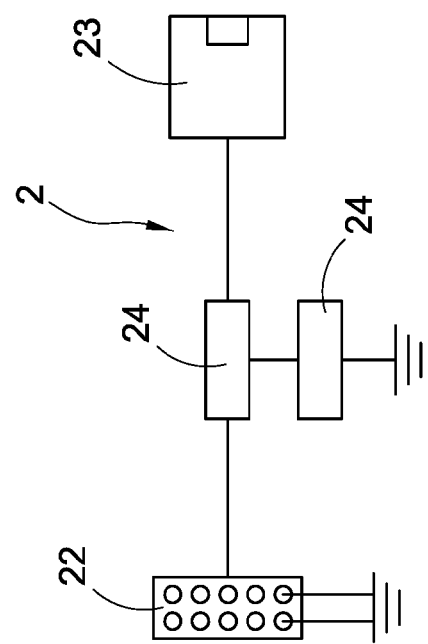
FIG. 5 is a diagram illustrating a signal suppression circuit.

Please refer to FIG. 5 which is a diagram illustrating a signal suppression circuit. As shown in the drawing, the first connector 22 of the signal suppression circuit 2 is electrically connected to the transmission line 1 (see FIG. 2), the second connector 23, and the protectors 24. When the second connector 23 is under normal signal conditions, the protectors 24 are not activated, input signals are directly transmitted to the first connector 22 and are output from the first connector 22. When the second connector 23 is under an abnormal signal condition (caused by electrostatic discharge, electrical fast transients, lightning, cable discharge events or etc.), the protectors 24 are activated, so that abnormal signals will not be transmitted to the first connector 22, thereby protecting the electronic devices (not illustrated) connected outside to the first connector 22 from being damaged by the abnormal signals.

Please refer to FIG. 6 which is a schematic view illustrating the outdoor external lightning arrestor in use, and also refer to FIG. 3. As shown in the drawings, when the outdoor external lightning arrestor 10 is in use, the male connector 12 of the transmission line 1 is inserted in a female connector 201 of an outdoor data transmitting device 20, the external threaded portion 51 of the metal housing 5 is fastened to the outdoor data transmitting device 20, a male connector of an outside cable (not illustrated) is inserted in the second connector 23 of the circuit board 21, and then a cable gland (not illustrated) of the outside cable is engaged with the internal threaded portion 52 of the metal housing 5.

When the data transmitting device 20 is transmitting or receiving signals at the normal signal conditions, the signal is transmitted to the first connector 22 via the transmission line 1, then is transmitted to the second connector 23 via the circuit board 21, and then is transmitted to the outside cable (not illustrated) from the second connector 23.

In a process of transmitting or receiving signals, when there are abnormal signals caused by electrostatic discharge, electrical fast transients, lightning, cable discharge events or so forth, and a metal casing 202 covers the outside of the female connector 201 of the data transmitting device 20 where the male connector 12 of the transmission line 1 is inserted, the protector 24 is activated by the circuit board 21 to discharge energy of the abnormal signals. The energy is transmitted from the first connector 22 to the ground layer 113 of the transmission line 1, then from the ground layer 113 to the metal casing 121 of the male connector 12, and then from the metal casing 12 of the male connector 12 to the metal casing 202 outside the female connector 201 to be discharged from the metal casing 202.

When there are abnormal signals in the process of transmitting or receiving signals, and the metal casing 202 does not wrap the outside of the female connector 201 of the data transmitting device 20 where the male connector 12 of the transmission line 1 is inserted, then the protectors 24 on the circuit board 21 are activated to make a discharge. The second connector 23 will transmit the abnormal signals to the metal casing 231 of the second connector 23, then the abnormal signals will be transmitted from the metal casing 231 to the first resilient plate 42 of the ground member 4, then will be transmitted from the first resilient plate 42 to the second resilient plate 43, and then will be transmitted from the second resilient plate 43 to the metal housing 5 to be discharged therefrom, so that the abnormal signals will not be transmitted to the signal line 111, thus protecting the electronic device (not illustrated) connected outside to the data transmitting device 20 from being damaged by electrostatic discharge, electrical fast transients, lightning, cable discharge events and so forth.

When the abnormal signals are transmitted to the second connector 23, the second connector 23 sends the abnormal signals to the metal casing 231 of the second connector 23, then the abnormal signals are transmitted from the metal housing 231 to the first resilient plate 42 of the ground member 4, then the abnormal signals are transmitted from the first resilient plate 42 to the second resilient plate 43, and then are transmitted from the second resilient plate 43 to the metal housing 5 to make a discharge.

Accordingly, when the data transmitting device 20 is affected by electrostatic discharge, electrical fast transients, lightning, cable discharge events and so forth, a discharge path is selected according to configuration of the male connector, the signal suppression circuit and the ground member of the outdoor external lightning arrestor 10 so as to protect the electronic devices connected to the data transmitting device 20 from being damaged by electrostatic discharge, electrical fast transients, lightning, cable discharge events and so forth.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. An outdoor external lightning arrestor, comprising:
   a transmission line including a cable, the cable at least including a ground layer, one end of the cable is electrically connected to a male connector, a metal casing wrapping outside the male connector, the metal casing being electrically connected to the ground layer;
   a signal suppression circuit including a circuit board thereon, a first connector, a second connector, and at least one protector being electrically connected to the circuit board, the first connector being electrically connected to the cable and the ground layer, a metal casing wrapping outside the second connector;
   insulation housing assembled to the circuit board, the second connector being exposed outside the insulation housing, the transmission line extending outside the insulation housing;
   a ground member assembled inside the insulation housing and disposed over the circuit board, one side of the ground member including a first resilient plate, the first resilient plate being in electrical contact with the metal casing of the second connector, the other side of the ground member including a second resilient plate, the second resilient plate being exposed outside from the insulation housing, wherein when an abnormal signal is input, a discharge path is selected according to configuration of the male connector, the signal suppression circuit and the ground member.

2. The outdoor external lightning arrestor of claim 1, further comprising a receiver, the receiver including a female connector, a metal casing wrapping the female connector.

3. The outdoor external lightning arrestor of claim 1, further comprising a metal housing, the metal housing being a hollow column, one end of the metal housing including an external threaded portion, the other end of the metal housing including an internal threaded portion, the metal housing being assembled to the insulation housing, so that the second resilient plate is in electrical contact with the metal housing.

4. The outdoor external lightning arrestor of claim 1, wherein the insulation housing consists of two housing members, a front end of each of the two housing members includes an assembling portion assembled on a buffer ring, a distal end of the two housing members includes an opening, the second connector is exposed from the opening, a through hole is disposed on an upper portion of the two housing members, and the second resilient plate is exposed from the through hole.

5. The outdoor external lightning arrestor of claim 4, wherein the ground member includes a connection pillar, the first resilient plate of curved shape is connected at one side of the connection pillar, a connection plate extends from one side of the first resilient plate, the connection plate includes two connection holes, and the other side of the connection pillar is connected to the second resilient plate of curved shape.

6. The outdoor external lightning arrestor of claim 5, wherein one of the two housing members includes a plurality of rib plates in longitudinal and transverse directions and also includes two protruding pillars disposed at one side of the rib plates and inserted through the two connection holes, the circuit board is fixed by the rib plates, the ground member is fixed by the two protruding pillars, a plurality of lock pillars are disposed among the rib plates, the lock pillars are disposed corresponding to a plurality of assembling holes of the other housing member, and a plurality of fastening elements are inserted through the assembling holes to fasten the lock pillars.

7. The outdoor external lightning arrestor of claim 1, wherein a plurality of signal lines electrically connected to the male connector are disposed inside the cable, a separation layer wraps outside the signal lines, a ground layer wraps outside the separation layer, and an insulation layer wraps outside the ground layer.

8. The outdoor external lightning arrestor of claim 7, wherein the male connector is an Internet connector plug.

9. The outdoor external lightning arrestor of claim 1, wherein the second connector is an Internet female connector.

10. The outdoor external lightning arrestor of claim 1, wherein the protectors are transient-voltage suppressors.

* * * * *